(12) United States Patent
Kirschenmann et al.

(10) Patent No.: US 7,010,278 B2
(45) Date of Patent: Mar. 7, 2006

(54) SIDEBAND SUPPRESSION METHOD AND APPARATUS FOR QUADRATURE MODULATOR USING MAGNITUDE MEASUREMENTS

(75) Inventors: Mark A. Kirschenmann, Chandler, AZ (US); Sumit A. Talwalkar, Plantation, FL (US)

(73) Assignee: Freescale Semiconductor, Inc., Austin, TX (US)

( * ) Notice: Subject to any disclaimer, the term of this patent is extended or adjusted under 35 U.S.C. 154(b) by 477 days.

(21) Appl. No.: 10/280,631

(22) Filed: Oct. 25, 2002

(65) Prior Publication Data

US 2004/0082305 A1  Apr. 29, 2004

(51) Int. Cl.
  *H04B 1/04*  (2006.01)
(52) U.S. Cl. .................. 455/114.2; 375/296
(58) Field of Classification Search ............ 455/114.1, 455/114.2, 114.3, 115.1, 115.2, 126, 127.2, 455/67.14, 108, 110; 375/296, 297, 345, 375/300, 302
See application file for complete search history.

(56) References Cited

U.S. PATENT DOCUMENTS

| | | | | |
|---|---|---|---|---|
| 5,293,406 A | * | 3/1994 | Suzuki | 375/295 |
| 5,423,082 A | * | 6/1995 | Cygan et al. | 455/126 |
| 5,847,619 A | * | 12/1998 | Kirisawa | 332/103 |
| 5,901,346 A | | 5/1999 | Stengel et al. | 455/126 |
| 6,351,677 B1 | * | 2/2002 | Leyonhjelm et al. | 700/44 |
| 6,593,827 B1 | * | 7/2003 | Chethik et al. | 332/103 |
| 6,771,709 B1 | * | 8/2004 | Huang et al. | 375/296 |
| 2002/0015450 A1 | | 2/2002 | Ratto | 375/261 |
| 2002/0018531 A1 | | 2/2002 | Ratto | 375/297 |
| 2002/0024398 A1 | | 2/2002 | Lagerblom et al. | 332/103 |
| 2004/0165678 A1 | * | 8/2004 | Nadiri | 375/296 |

OTHER PUBLICATIONS

Olson and Stengel, "LINC imbalance correction using baseband preconditioning," paper presented at the *IEEE Radio and Wireless Conference (RAWCON) Proceedings*, 1999.

* cited by examiner

*Primary Examiner*—Nguyen T. Vo
(74) *Attorney, Agent, or Firm*—Fulbright & Jaworski LLP

(57) ABSTRACT

Systems and methods are described for a sideband suppression technique for quadrature modulation using magnitude measurements. Gain imbalance, phase imbalance, or both gain and phase imbalance are corrected in a quadrature modulator. Predetermined voltage levels are applied to one or both of the quadrature modulator input channels and resultant output magnitudes are measured. Then, a gain correction factor, a phase correction factor or both gain and a phase correction factors are determined as a function of the measured output magnitudes. Gain imbalance, phase imbalance or both gain and imbalance are then corrected using the gain and phase correction factors.

17 Claims, 6 Drawing Sheets

SIDEBAND SUPPRESSION METHOD AND APPARATUS FOR QUADRATURE MODULATOR USING MAGNITUDE MEASUREMENTS

BACKGROUND OF THE INVENTION

1. Field of the Invention

The invention relates generally to the field of communications. More particularly, the invention relates to the correction of gain and phase errors in a quadrature modulator.

2. Discussion of the Related Art

Quadrature modulation techniques enable two independent signals to be combined at a transmitter, transmitted on the same transmission band, and separated at a receiver. The principle of quadrature modulation is that two separate signals, I and Q (In-phase and Quadrature phase), are modulated by using the same carrier wave frequency, but the carrier wave of signal Q is 90° out of phase with the carrier wave of signal I. After modulation, the resulting signals are summed and transmitted. Because of the phase difference, the I and Q signals can be separated from each other when the summed signal is demodulated at the receiver.

Unfortunately, in practical applications, effects of gain imbalance and local oscillator phase error cause errors in the mutual phase and amplitude balance of the I and Q signals. For example, in the case of a single tone input to the quadrature modulator, the modulator output usually contains an undesired tone referred to as the sideband. If the desired output is located at $\omega_c+\omega$ (where $\omega_c$ is the carrier frequency), then the undesired sideband is located at $\omega_c-\omega$. Gain imbalance and phase error lead to the degradation of error vector magnitude (EVM) of the transmitter and bit error rate (BER) performance at the receiver.

Until now, the requirements of providing a sideband suppression technique for quadrature modulator using magnitude measurements have not been met.

SUMMARY OF THE INVENTION

There is a need for the following embodiments. Of course, the invention is not limited to these embodiments.

According to an aspect of the invention, a method for correcting a gain imbalance in a quadrature modulator comprises applying a first voltage level to a first quadrature modulator channel and measuring a first output amplitude, applying a second voltage level to a second quadrature modulator channel and measuring a second output amplitude, determining a gain correction factor as a function of the first output amplitude and the second output amplitude, and correcting the gain imbalance based on the gain correction factor. According to another aspect of the invention, a method for correcting a phase imbalance in a quadrature modulator comprises: applying a first phase and a first voltage level to a first quadrature modulator channel while applying the first voltage level to a second quadrature modulator channel and measuring a first output amplitude, applying the first phase and the first voltage level to the first quadrature modulator channel while applying a second voltage level to the second quadrature modulator channel and measuring a second output amplitude, applying a second phase and the first voltage level to the first quadrature modulator channel while applying the first voltage level to a second quadrature modulator channel and measuring a third output amplitude, applying the second phase and the first voltage level to the first quadrature modulator channel while applying the second voltage level to the second quadrature modulator channel and measuring a fourth output amplitude, determining a phase correction factor as a function of the first, second, third and fourth output amplitudes and the first phase, and correcting the phase imbalance based on the phase correction factor. The invention may also include using these techniques to correct both gain and phase imbalances, thus minimizing an undesired sideband level in the limit as an offset frequency approaches zero.

According to another aspect of the invention, a baseband correction unit for correcting a gain and a phase imbalance in a quadrature modulator comprises an error estimation circuit coupled to an output of the quadrature modulator via a detection circuit and to a pair of inputs to the quadrature modulator via a gain and phase compensating circuit, the error estimation circuit being operable to apply at least one predetermined voltage at a predetermined phase to the pair of inputs to the quadrature modulator to detect at least one amplitude of an output voltage of said quadrature modulator, to calculate a gain and a phase imbalance as a function of said at least one detected amplitude and as a result of application of said at least one predetermined voltage at a predetermined phase to the pair of inputs to the quadrature modulator, and to apply a gain and a phase correction to the pair of inputs to the quadrature modulator.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein like reference numerals (if they occur in more than one view) designate the same elements. The invention may be better understood by reference to one or more of these drawings in combination with the description presented herein. It should be noted that the features illustrated in the drawings are not necessarily drawn to scale.

DETAILED DESCRIPTION

The invention and the various features and advantageous details thereof are explained more fully with reference to the nonlimiting embodiments that are illustrated in the accompanying drawings and detailed in the following description. It should be understood that the detailed description, while indicating specific embodiments of the invention, is given by way of illustration only and not by way of limitation. Various substitutions, modifications, additions and/or rearrangements within the spirit and/or scope of the underlying inventive concept will become apparent to one of ordinary skill in the art in light of this disclosure.

Figure 1:
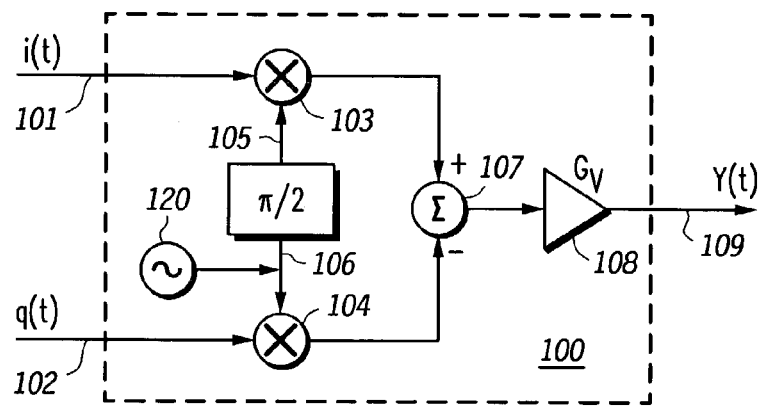
FIG. 1 is a block diagram of an ideal quadrature modulator.

Referring to FIG. 1, a block diagram of an ideal quadrature modulator 100 is depicted. A pair of baseband inputs 101, 102 correspond to an in-phase input i(t) and a quadrature input q(t), respectively. The i(t) input 101 is coupled to a first mixer 103, where it is multiplied by a first carrier 105. The q(t) input 102 is coupled to a second mixer 104, where it is multiplied by a second carrier 106. Both carriers 105 and 106 are provided by a local oscillator (LO) 120. The first carrier 105 may be a function such as $\cos(\omega_C t)$ and is 90° out of phase with respect to the second carrier 106, which may be a function such as $\sin(\omega_C t)$. The first carrier 105 has the same frequency $\omega_C$ as the second carrier 106. The output of the first mixer 103 is coupled to the positive summer input of a summer 107, and the output of mixer 104 is coupled to the negative summer input of the summer 107. The output of the summer 107 is coupled to an amplifier 108 where it receives a gain Gv. The output of the amplifier 108 is a quadrature modulated output y(t) 109. Thus, the output y(t) 109 of the ideal modulator 100 may be expressed as:

$$y(t) = G_v[i(t)\cos(\omega_C t) - q(t)\sin(\omega_C t)] \quad \text{Equ. 1}$$

Figure 2:
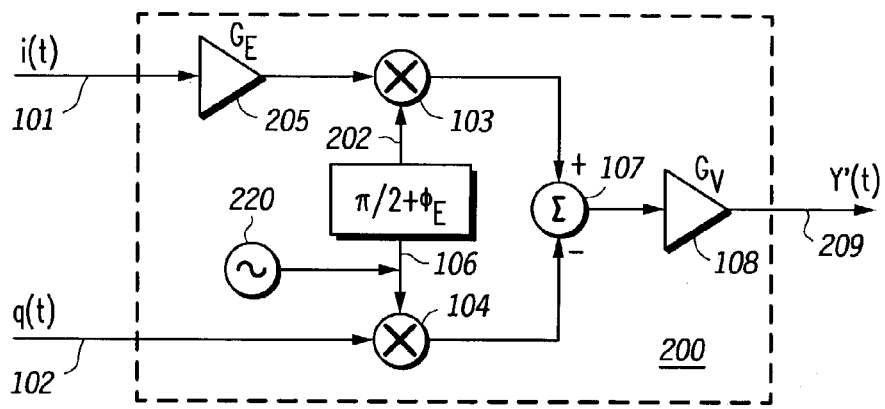
FIG. 2 is a block diagram of a real quadrature modulator with gain error and phase error.

Referring to FIG. 2, a block diagram of a real quadrature modulator 200 with gain error $G_E$ and phase error $\Phi_E$ is depicted. The i(t) input 101 is subject to a gain imbalance $G_E$ 205. The first carrier 202 may be a function such as $\cos(\omega_C t + \Phi_E)$, where $\Phi_E$ is a phase error. The second carrier 106 may be a $\sin(\omega_C t)$ function. Both carriers 106, 202 are provided by a local oscillator (LO) 220. The output y'(t) 209 of the real modulator 200 may thus be expressed as:

$$y'(t) = G_v[G_E i(t)\cos(\omega_C t + \Phi_E) - q(t)\sin(\omega_C t)] \quad \text{Equ. 2}$$

Still referring to FIG. 2, in a case where i(t) 101 and q(t) 102 are single tones in exact quadrature (i.e. $i(t) = \cos(\omega t)$ and $q(t) = \sin(\omega t)$), the output y'(t) 209 comprises a pair of tones, wherein the desired tone is at a frequency $\omega_C + \omega$ and an undesired sideband is at a frequency $\omega_C - \omega$. The ratio of the two magnitudes in dB is defined as sideband suppression (SS):

$$SS(\text{dB}) = 10\log\left(\frac{(G_E)^2 + 1 + 2G_E\cos(\Phi_E)}{(G_E)^2 + 1 - 2G_E\cos(\Phi_E)}\right) \quad \text{Equ. 3}$$

Figure 3:
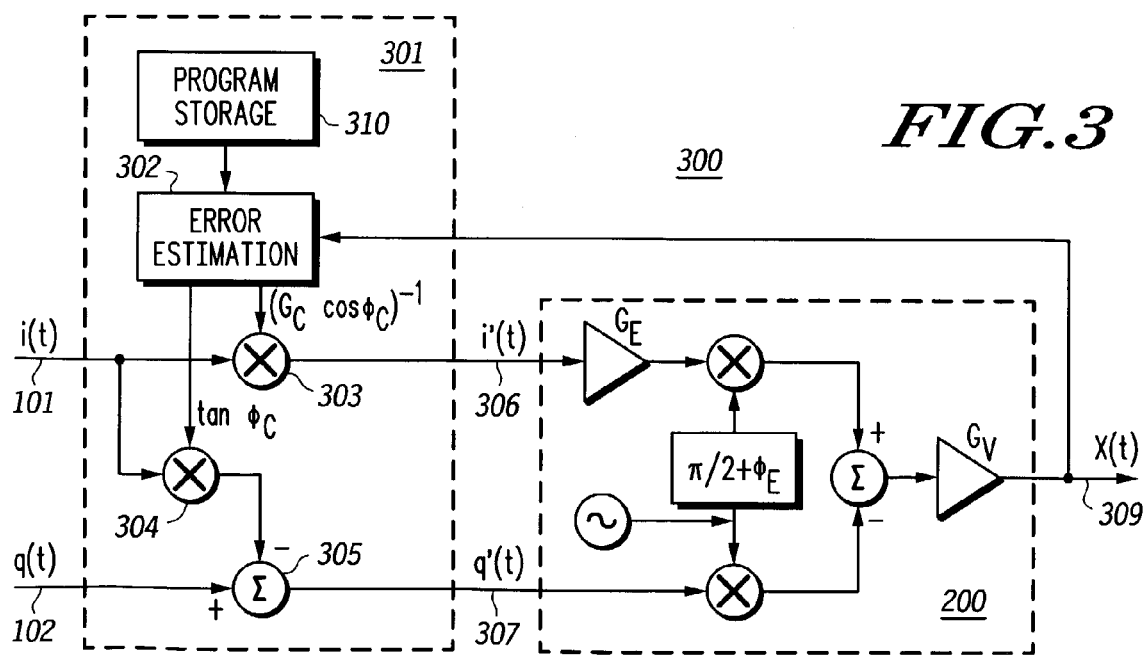
FIG. 3 is a block diagram of a sideband suppression system, representing an embodiment of the invention.

Referring to FIG. 3, a block diagram of a sideband suppression system 300 is depicted according to one aspect of the invention. The i(t) and q(t) inputs 101, 102 are fed to a baseband correction unit 301. The baseband correction unit 301 comprises an error estimation circuit 302 which may determine a gain correction $G_C$ parameter and a phase correction $\Phi_C$ parameter by probing the output x(t) 309 of the real modulator 200 and performing gain and phase imbalance correction methods. In practice, the error estimation circuit 302 may be a programmable circuit, such as, for example, a microprocessor or digital signal processor-based circuit, that operates in accordance with instructions stored in a program storage media 310. The program storage media 310 may be any type of readable memory including, for example, a magnetic or optical media such as a card, tape or disk, or a semiconductor memory such as a PROM or FLASH memory. The error estimation circuit 302 may be implemented in software, such as, for example, a software defined radio algorithm, or the functions may be implemented by a hardware circuit, or by a combination of hardware and software.

When the error estimation circuit 302 is a programmable circuit, a program, such as that presented below and discussed in detail with reference to FIGS. 4, 5, 7 and 9, is stored in the program storage media 310 to create an apparatus in accordance with the present invention that operates in accordance with the methods of the present invention. In the alternative, the error estimation circuit 302 may be hard-wired or may use predetermined data tables, or may be a combination of hard-wired and programmable circuitry. Specific examples are presented below in detail, with reference to FIGS. 10–12.

Still referring to FIG. 3, the i(t) input 101 may be divided by a $G_C \cos(\Phi_C)$ factor in the multiplier 303, where $G_C$ is a gain correction factor and $\Phi_C$ is a phase correction factor, resulting in a corrected i'(t) input 306 to the real modulator 200. The i(t) input 101 may also be multiplied by a $\tan(\Phi_C)$ factor in the multiplier 304, and its output coupled to the negative input of a summer 305. The q(t) input 102 is coupled to the positive input of the summer 305, which results in a corrected q'(t) input 307 to the real modulator 200.

Still referring to FIG. 3, the corrected i'(t) and q'(t) inputs 306, 307 are:

$$i'(t) = \frac{i(t)}{G_C \cos(\Phi_C)} \quad \text{Equ. 4}$$

$$q'(t) = q(t) - i(t)\tan(\Phi_C) \quad \text{Equ. 5}$$

Using the corrected inputs 306, 307 as inputs to the real modulator 200, the corrected real modulator output x(t) 309 is:

$$x(t) = G_V[G_E i'(t)\cos(\omega_C t + \Phi_E) - q'(t)\sin(\omega_C t)] \quad \text{Equ. 6}$$

$$= G_V\left\{\frac{G_E i(t)\cos(\omega_C t + \Phi_E)}{G_C \cos(\Phi_C)} - [q(t) - i(t)\tan(\Phi_C)]\sin(\omega_C t)\right\}$$

-continued $$= G_V \left\{ \frac{G_E \cos(\Phi_E)}{G_C \cos(\Phi_C)} i(t)\cos(\omega_C t) - q(t)\sin(\omega_C t) + \left( \tan(\Phi_C) - \frac{G_E \sin(\Phi_E)}{G_C \cos(\Phi_C)} \right) i(t)\sin(\omega_C t) \right\}$$

Thus, when $G_C=G_E$ and $\Phi_C=\Phi_E$, the third term vanishes and the corrected real modulator output x(t) 309 equals the ideal case detailed in FIG. 1 and defined by equation 1. The present invention includes a method and apparatus for estimating and applying a gain and a phase correction $G_C$, $\Phi_C$ at baseband which are substantially equal to the gain and phase errors $G_E$, $\Phi_E$ produced by a real quadrature modulator. In addition, this estimation and correction application is accomplished using magnitude-measurements.

Figure 4:
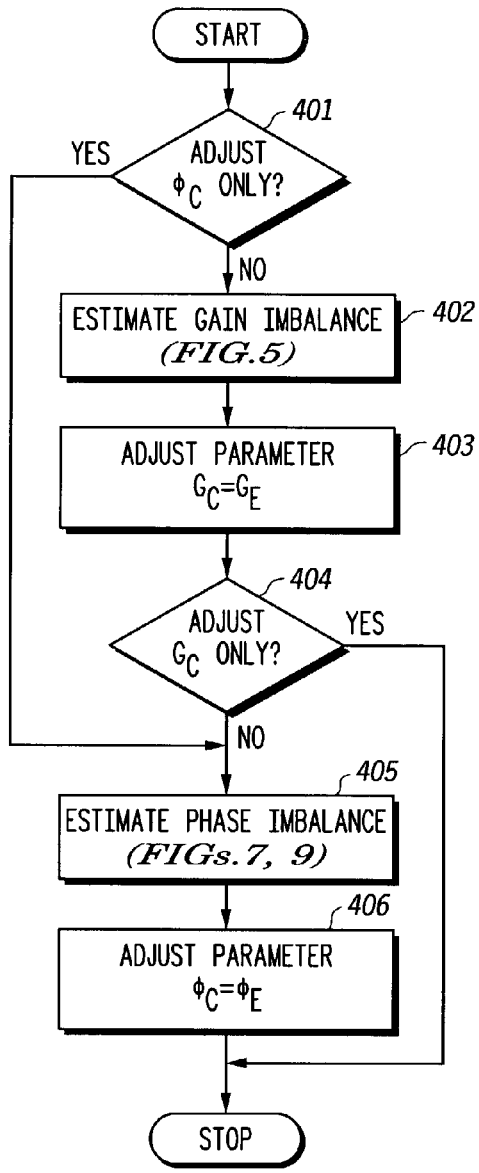
FIG. 4 is a flow chart of a sideband suppression method, representing an embodiment of the invention.

Referring to FIG. 4, a flow chart of a sideband suppression method 400 is depicted according to one aspect of the invention. The method 400 may be initiated during a training period or test time. First, a decision is made about whether only the phase should be adjusted 401. If the result of 401 is no, a gain imbalance $G_E$ is estimated 402 (as detailed in FIG. 5), and a gain correction parameter $G_C$ is adjusted 403 so that $G_C=G_E$. Control then passes to decision block 404 to determine whether only the gain should be adjusted. If the result of 401 is yes or if the result of 404 is no, then a phase error $\Phi_E$ is estimated 405 (as detailed in FIG. 7 or 9) and a phase correction parameter is adjusted 406 so that $\Phi_C=\Phi_E$. If the result of 404 is yes, then the method 400 may stop.

Figure 5:
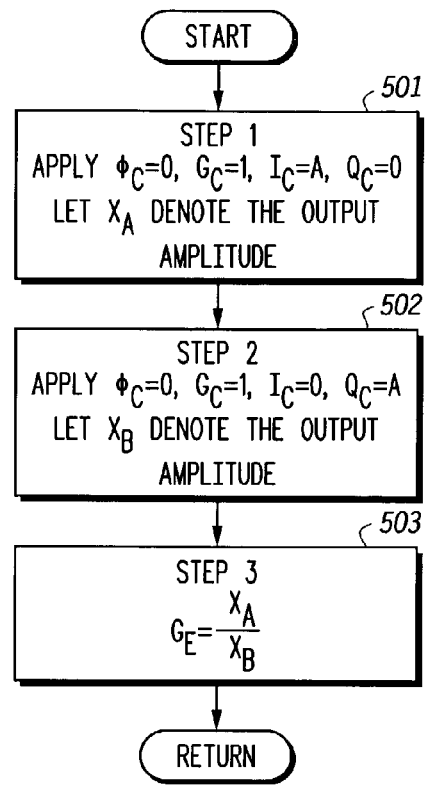
FIG. 5 is a flow chart of a gain imbalance estimation method, representing an embodiment of the invention.

Referring to FIG. 5, a flow chart of a gain imbalance estimation method 500 is depicted according to one aspect of the invention. This method may be performed by the error estimation circuit 302 of the baseband correction unit 301 detailed in FIG. 3. For the following procedure, a gain correction $G_C$ value of 1 and a phase correction value $\Phi_C$ of 0 degrees are maintained. In a first step 501, the i(t) input 101 is set at a DC voltage value of A volts and the q(t) input 102 is set at a DC voltage of 0 volts. A first output amplitude $X_A=|AG_E \cos(\omega_C t+\Phi_E)|=AG_E$ is measured. In a second step 502, the i(t) input 101 is set at 0 volts while the q(t) input 102 is set at a DC voltage value of A volts. A second output amplitude $X_B=|A \cos(\omega_C t)|=A$ is measured. Since DC inputs are applied in steps 501, 502, the outputs of amplitudes $X_A$ and $X_B$ are single tones at the carrier frequency $\omega_C$.

Still referring to FIG. 5, the value of A should be chosen to address two competing requirements. As the value of A increases, the undesirable effects of analog-to-digital quantization decrease. On the other hand, as the value of A decreases, undesirable effects of the RF detector non-linearity decrease. Thus, once the analog-to-digital quantization and the RF detector characteristics are known, the value of A should be chosen to simultaneously optimize over these requirements. The maximum possible value of A is full-scale value (of the analog-to-digital converter or digital-to-analog converter, whichever is smaller) divided by the maximum possible value of the gain error $G_E$.

Still referring to FIG. 5, in a third step 503, a gain imbalance $G_E$ and thus a gain correction factor $G_C$, may be calculated as a ratio between $X_A$ and $X_B$:

$$G_E = \frac{X_A}{X_B} \quad \text{Equ. 7}$$

Referring to FIGS. 3 and 4, a phase correction method may be applied to a sideband suppression system after a gain correction has been estimated. If the i(t) input 101 and q(t) input 102 are expressed as $i(t)=(s_I)A$ and $q(t)=(s_Q)A$, where $s_I$ and $s_Q$ denote the signs (+1 or −1), and $G_C=G_E$, the real modulator output x(t) 309 originally defined by equation 6 may be written as:

$$x(t) = As_I \frac{\cos(\omega t + \Phi_E)}{\cos(\Phi_C)} - [(s_Q - s_I \tan(\Phi_C))]\sin(\omega t) \quad \text{Equ. 8}$$

$$= A \left\{ \left[ \frac{s_I \cos(\Phi_E)}{\cos(\Phi_C)} \right] \cos(\omega t) - \left[ s_Q - s_I \tan(\Phi_C) + \frac{s_I \sin(\Phi_E)}{\cos(\Phi_C)} \right] \sin(\omega t) \right\}$$

The amplitude is a function of the signs $s_I$, $s_Q$, and the phase correction $\Phi_C$ applied in the baseband correction unit 301. Denoting this dependence explicitly:

$$[X_{s_I,s_Q}(\Phi_C)]^2 = A^2 \left\{ \left[ \frac{s_I \cos(\Phi_E)}{\cos(\Phi_C)} \right]^2 + \left[ s_Q - s_I \tan(\Phi_C) + \frac{s_I \sin(\Phi_E)}{\cos(\Phi_C)} \right]^2 \right\} \quad \text{Equ. 9}$$

$$= A^2 \left\{ \frac{1}{(\cos\Phi_C)^2} + 1 + (\tan\Phi_C)^2 - \frac{2\tan\Phi_C \sin\Phi_E}{\cos\Phi_C} + \frac{2s_I s_Q}{\cos\Phi_C}(\sin\Phi_E - \sin\Phi_C) \right\}$$

The first three terms in equation 9 are independent of the sign terms $s_I$, $s_Q$. The difference term is:

$$[X_{1,1}(\Phi_C)]^2 - [X_{1,-1}(\Phi_C)]^2 = A^2 \left\{ \frac{4}{\cos\Phi_C}(\sin\Phi_E - \sin\Phi_C) \right\} \quad \text{Equ. 10}$$

Using $x \sim \sin(x)$ (the approximation error is less than 1% for angles up to 14°) and denoting the left hand side of equation 10 (a difference in magnitude square function) by $f_{1,2}(\Phi_C)$:

$$f_{1,2}(\Phi_C) \approx A^2 \left( \frac{4}{\cos\Phi_C}(\Phi_E - \Phi_C) \right) \quad \text{Equ. 11}$$

In equation 11, the subscript $_{1,2}$ signifies that the difference is calculated by applying the I and Q channel corrections in the first quadrant and the second quadrant in the I-Q plane.

Figure 6:
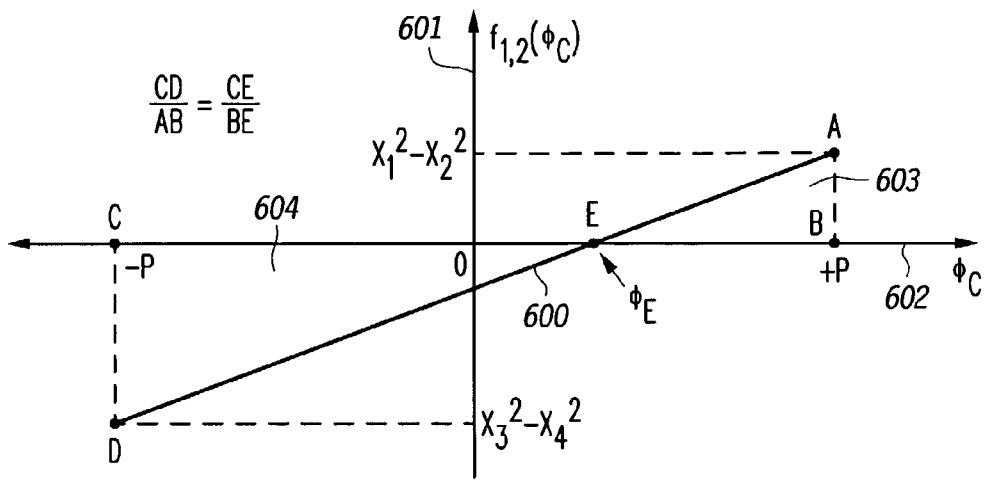
FIG. 6 is a graph of a phase error estimation method, illustrating an embodiment of the invention.

Referring to FIG. 6, a graph of a phase error estimation method of the present invention is depicted. The vertical axis 601 is the difference in magnitude square function ($f_{1,2}(\Phi_C)$), and the horizontal axis 602 is the error correction $\Phi_C$. Sweeping over the applied correction parameter $\Phi_C$, and plotting the difference in magnitude square function ($f_{1,2}(\Phi_C)$) makes a linear curve 600 crossing the zero value at $\Phi_C=\Phi_E$. The difference may be calculated at two points: $\Phi_C=P$ and $\Phi_C=-P$. The corresponding magnitude output terms are: $X_1=X_{1,1}(P)$; $X_2=X_{1,-1}(P)$; $X_3=X_{1,1}(-P)$; and $X_4=X_{1,-1}(-P)$.

Still referring to FIG. 6, using the similarity of triangles ABE 603 and CDE 604:

$$\frac{-(X_3^2 - X_4^2)}{X_1^2 - X_2^2} = \frac{\Phi_E + P}{P - \Phi_E}, \text{ therefore} \quad \text{Equ. 12}$$

$$\Phi_E = -P \frac{(X_1^2 - X_2^2) + (X_3^2 - X_4^2)}{(X_1^2 - X_2^2) - (X_3^2 - X_4^2)}$$

$$= -P \frac{(X_1 - X_2)(X_1 + X_2) + (X_3 - X_4)(X_3 + X_4)}{(X_1 - X_2)(X_1 + X_2) - (X_3 - X_4)(X_3 + X_4)}$$

With proper choice of the value P, $(X_1+X_2) \sim (X_3+X_4)$ and:

$$\Phi_E = -P \frac{(X_1 - X_2) + (X_3 - X_4)}{(X_1 - X_2) - (X_3 - X_4)} \quad \text{Equ. 13}$$

The value of P should be chosen to address two competing requirements. As the value of P increases, the undesirable effects of analog-to-digital quantization decrease. On the other hand, as the value of P decreases, undesirable effects of the RF detector non-linearity decrease. Thus, once the analog-to-digital quantization and the RF detector characteristics are known, the value of P should be chosen to simultaneously optimize over these requirements.

Figure 7:
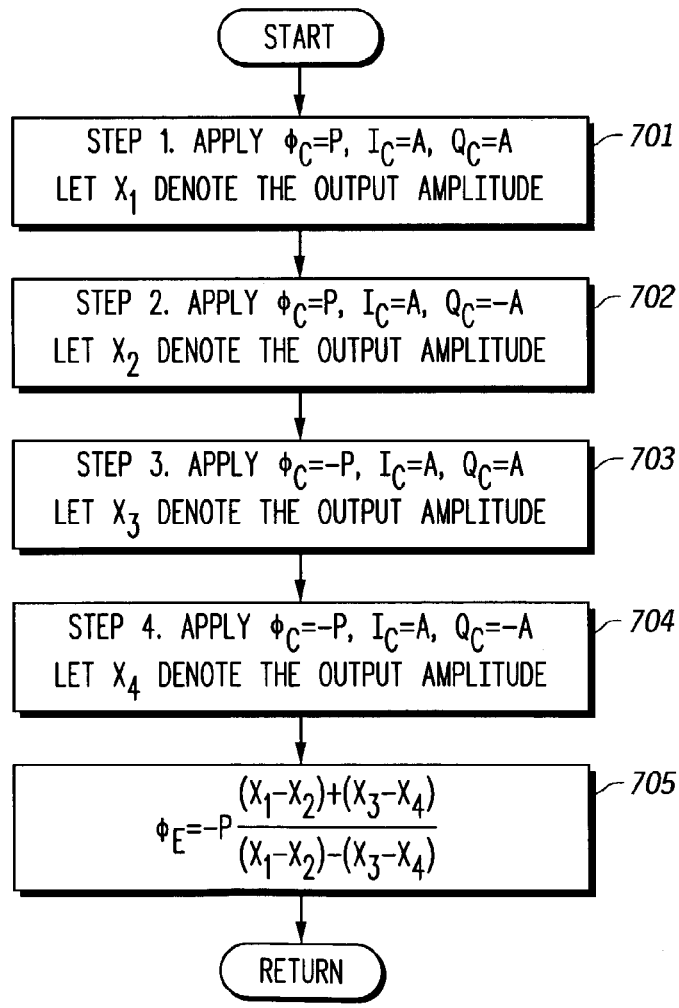
FIG. 7 is a flow chart of a phase error estimation method, representing an embodiment of the invention.

Referring to FIG. 7, a flow chart of a phase error estimation method 700 is depicted. This method may be performed in the error estimation circuit 302 of the baseband correction unit 301 detailed in FIG. 3. In a first step 701, a phase correction ($\Phi_C$) of P degrees is used while a DC voltage of A volts is applied to the i(t) input 101 and to the q(t) input 102. A first output amplitude $X_1$ is measured. In a second step 702, $\Phi_C$ is kept at P degrees while a DC voltage of A volts is applied to the i(t) input 101 and a DC voltage of −A volts is applied to the q(t) input 102. A second output amplitude $X_2$ is measured.

Still referring to FIG. 7, in a third step 703, $\Phi_C$ is kept at −P degrees while a DC voltage of A volts is applied to the i(t) input 101 and to the q(t) input 102. A third output amplitude $X_3$ is measured. In a fourth step 704, $\Phi_C$ is kept at −P while a DC voltage of A volts is applied to the i(t) input 101 and a DC voltage of −A volts is applied to the q(t) input 102. A fourth output amplitude $X_4$ is measured. In a fifth step 705, a phase imbalance $\Phi_E$ and thus a phase correction factor $\Phi_C$ may be estimated using equation 13, making $\Phi_C=\Phi_E$.

A sideband suppression method including the gain correction method detailed in FIG. 5 and the phase imbalance method detailed in FIG. 7 may be run after a carrier suppression is completed. Many carrier suppression methods are well known in the art. In practice, however, carrier suppression is not perfect. Thus, there may be residual DC offsets at the mixer inputs. Referring to FIG. 3, a first DC offset $i_{ERR}$ may appear in the I channel path between the sideband suppression block 301 and the real modulator 200. Similarly, a second DC offset $q_{ERR}$ may appear in the Q channel path. In this case, the real modulator output x(t) 309 is:

$$x(t) = A_{S_I} \frac{\cos(\omega_C t + \Phi_E)}{\cos(\Phi_C)} - [s_Q - s_I \tan\Phi_C]\sin(\omega_C t) + \quad \text{Equ. 14}$$

$$i_{ERR}\cos(\omega_C t + \Phi_E) - q_{ERR}\sin(\omega t)$$

Figure 8:
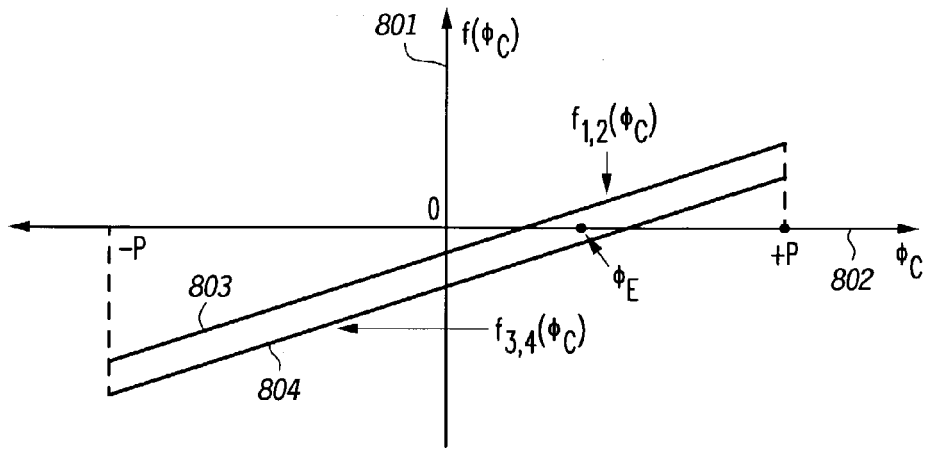
FIG. 8 is a graph of a phase error estimation method in the presence of uncorrected DC offsets, illustrating an embodiment of the invention.

Referring to FIG. 8, a graph of a phase error estimation method in the presence of uncorrected offsets is depicted. The vertical axis 801 is the difference in magnitude square terms ($f(\Phi_C)$), and the horizontal axis 802 is the error correction $\Phi_C$. The phase error may be estimated as an average between the two linear curves $f_{1,2}(\Phi_C)$ 803 and $f_{3,4}(\Phi_C)$ 804:

$$\Phi_E = \frac{-P}{2}\left[\frac{(X_1 - X_2) + (X_3 - X_4)}{(X_1 - X_2) - (X_3 - X_4)} + \frac{(X_5 - X_6) + (X_7 - X_8)}{(X_5 - X_6) - (X_7 - X_8)}\right] \quad \text{Equ. 15}$$

Figure 9:
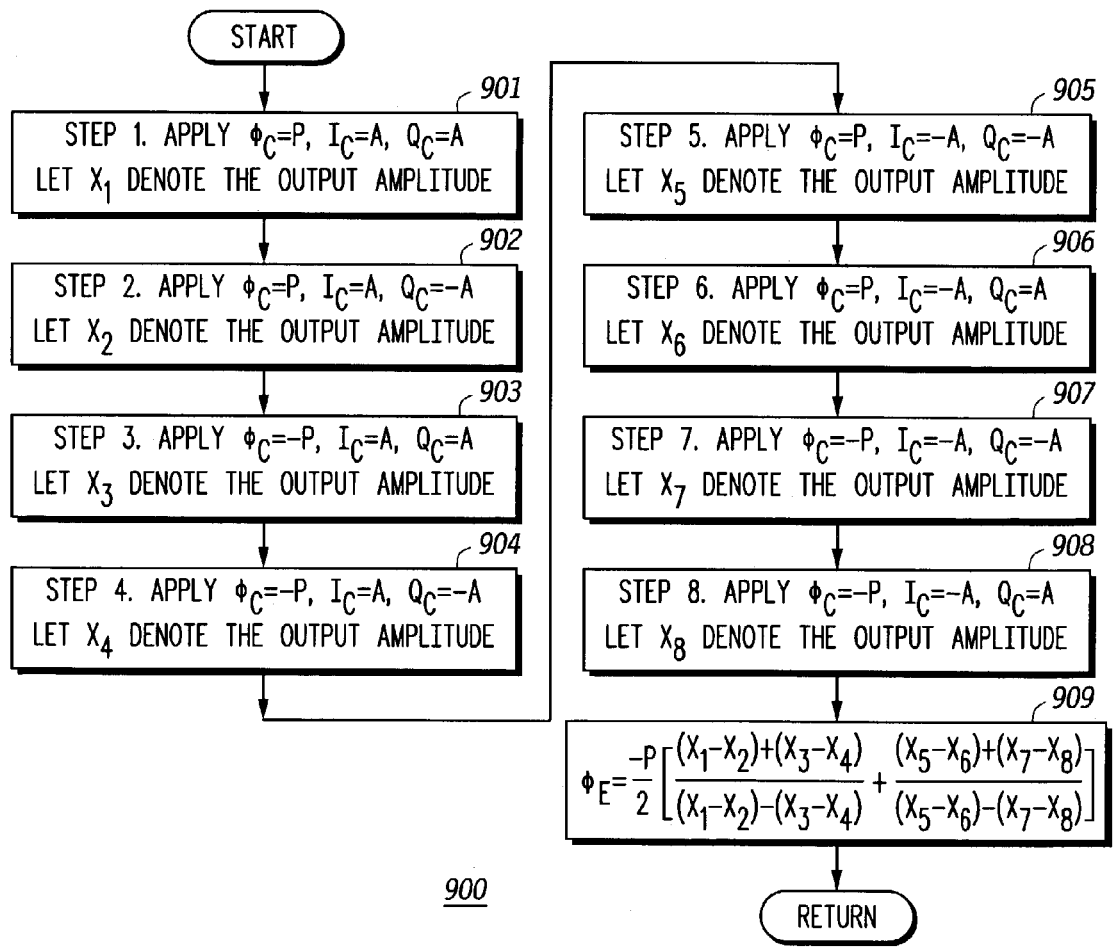
FIG. 9 is a flow chart of another phase error estimation method in the presence of uncorrected DC offsets, representing an embodiment of the invention.

Referring to FIG. 9, a flow chart of another phase error estimation method in the presence of uncorrected offsets 900 is depicted. This method may be performed in the error estimation circuit 302 of the baseband correction unit 301 detailed in FIG. 3. In a first step 901, a phase error correction factor $\Phi_C$ is kept at P degrees, the first input i(t) at A volts and the second input q(t) at A volts. A first output amplitude $X_1$ is measured. In a second step 902, $\Phi_C$ is kept at P degrees, the first input i(t) at A volts and the second input q(t) at −A volts. A second output amplitude $X_2$ is measured. In a third step 903, $\Phi_C$ is kept at −P degrees, the first input i(t) at A volts and the second input q(t) at A volts. A third output amplitude $X_3$ is measured. In a fourth step 904, $\Phi_C$ is kept at −P degrees, the first input i(t) at A volts and the second input q(t) at −A volts. A fourth output amplitude $X_4$ is measured. In a fifth step 905, $\Phi_C$ is kept at P degrees, the first input i(t) at −A volts and the second input q(t) at −A volts. A fifth output amplitude $X_5$ is measured.

Still referring to FIG. 9, in a sixth step 906, $\Phi_C$ is kept at P degrees, the first input i(t) at −A volts and the second input q(t) at A volts. A sixth output amplitude $X_6$ is measured. In a seventh step 907, $\Phi_C$ is kept at −P degrees, the first input i(t) at −A volts and the second input q(t) at −A volts. A seventh output amplitude $X_7$ is measured. In an eight step 908, $\Phi_C$ is kept at −P degrees, the first input i(t) at −A volts and the second input q(t) at A volts. An eight output amplitude $X_8$ is measured.

Still referring to FIG. 9, in a ninth step 909, a phase imbalance or error $\Phi_E$ and thus a phase correction factor $\Phi_C$ may be estimated using equation 15 and making $\Phi_C=\Phi_E$. As aspect of the invention includes a method and/or apparatus for phase imbalance correction in a quadrature modulator in the presence of residual DC offsets An aspect of the invention includes an apparatus which enables sideband suppression to be optimized for a radio frequency (RF) quadrature modulator without the use of special test equipment. Depending on the level of integration, this phasing may occur at circuit, board, or product level. In one embodiment, the invention includes a complex phase rotator sideband suppression system for performing a function of the baseband correction unit 301 detailed in FIG. 3. The complex phase rotator sideband suppression system may include a complex phase rotator and a sideband suppression look-up table and control circuit for performing the gain and phase imbalance methods as detailed in FIG. 4. Sideband suppression may be obtained with I/Q DC adjustments and measurements.

Figure 10:
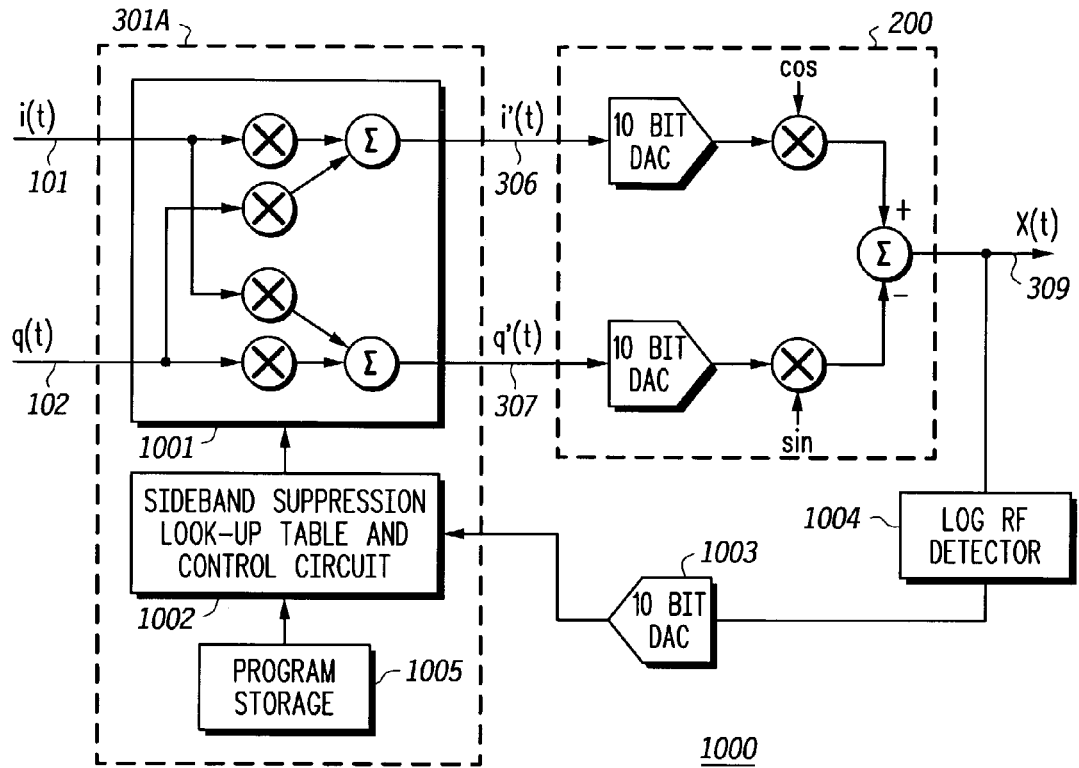
FIG. 10 is a block diagram of a complex phase rotator sideband suppression system, representing an embodiment of the invention.

Referring to FIG. 10, a block diagram of a complex phase rotator sideband suppression system 1000 is depicted in accordance with one aspect of the present invention. The i(t) input 101 and the q(t) input 102 are coupled to the baseband correction unit 301A comprising a gain and phase compensating circuit, which may be a complex phase rotator 1001 coupled to a sideband suppression look-up table and control circuit 1002. The sideband suppression look-up table and control circuit 1002 may perform a correction method such as the ones depicted in FIGS. 4, 5, 7 and/or 9 under control of a program stored in a program storage media 1005. The look-up table may be a scaled sine/cosine look up table. The complex phase rotator 1001 may apply a gain correction $G_C$ and a phase correction $\Phi_C$ to the inputs 101, 102, feeding corrected signals i'(t) 306 and q'(t) 307 to the real modulator 200.

Still referring to FIG. 10, the output 309 of the real modulator 200 is detected by a detector circuit, comprising an RF detector circuit 1004 coupled to an analog-to-digital converter circuit 1003. A digital signal from the analog-to-digital converter circuit 1003 coupled to the sideband suppression look-up table and control circuit 1002. A carrier suppression circuit (not shown) may make a carrier suppression correction to the outputs of the complex phase rotator 1001 before signals are processed by the real modulator 200. The processing of the real modulator 200 may include a digital-to-analog conversion.

Still referring to FIG. 10, the sideband suppression look-up table and control circuit 1002 can map detected magnitudes to phase offset numbers, generating the factors needed by the complex phase rotator 1001 to rotate the original input signals 101, 102 in the complex plane and compensate for the errors detected at the output 309 of the real modulator 200. This process may occur during a training period or test time, and may be utilized to apply $G_C$ and/or $\Phi_C$ to signals 101, 102, as shown in more detail with reference to FIG. 11.

Figure 11:
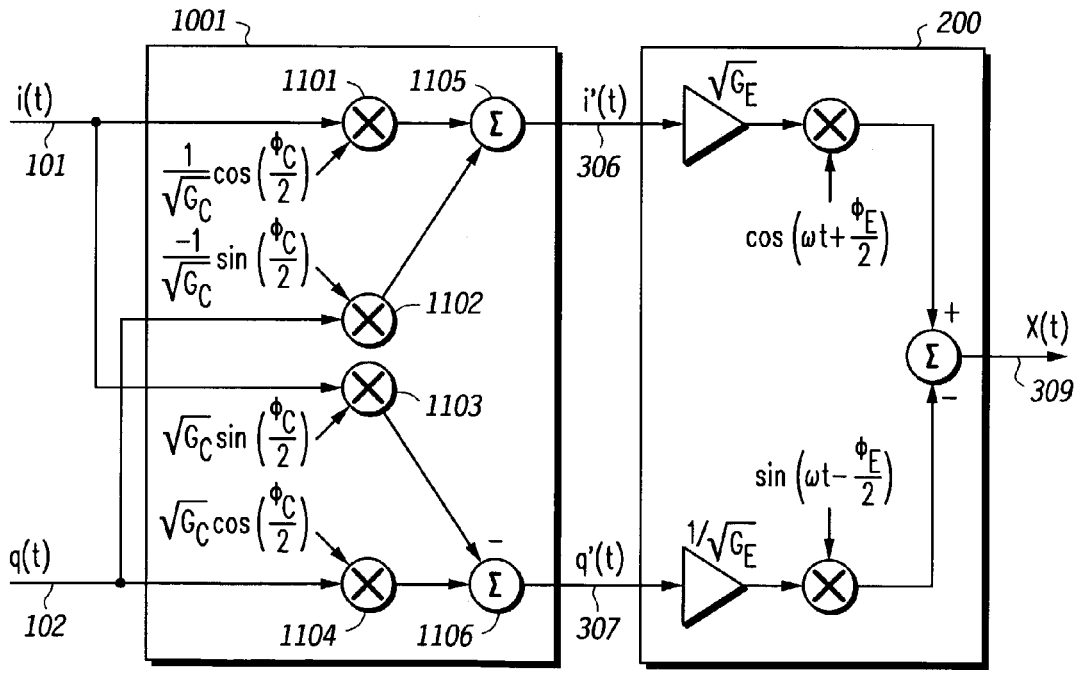
FIG. 11 is another block diagram of the complex phase rotator sideband suppression system, representing an embodiment of the invention.

Referring to FIG. 11, another block diagram of the complex phase rotator sideband suppression system is depicted according to one aspect of the invention. The real modulator 200 is depicted with gain imbalance $G_E$ and phase error $\Phi_E$ distributed in both channels. The sideband suppression look-up table and control circuit 1002 detailed in FIG. 10 is coupled to multipliers 1101, 1102, 1003, and 1004 detailed in FIG. 10.

Still referring to FIG. 11, the in-phase signal 101 is coupled to the first multiplier 1101 where it is multiplied by a $$\frac{1}{\sqrt{G_C}} \cos\left(\frac{\Phi_C}{2}\right)$$

factor. The quadrature signal 102 is coupled to the second multiplier 1102 where it is multiplied by a $$\frac{-1}{\sqrt{G_C}} \cos\left(\frac{\Phi_C}{2}\right)$$

factor and summed to the output of the first multiplier 1101 by a summer 1105, resulting in the corrected in-phase signal i'(t) 306. The in-phase signal 101 is also coupled to the third multiplier 1103 where it is multiplied by a $$\sqrt{G_C} \cos\left(\frac{\Phi_C}{2}\right)$$

factor. The quadrature signal 102 is coupled to the fourth multiplier 1104 where it is multiplied by a $$\sqrt{G_C} \cos\left(\frac{\Phi_C}{2}\right)$$

factor and summed to the opposite of the output of the third multiplier 1103 by a summer 1106, resulting in the corrected quadrature signal q'(t) 307. These corrections can effectively compensate for the gain error and phase imbalance incurred within the real modulator 200.

In another embodiment, the invention includes a gain and phase imbalance correction logic circuit for performing a function of the baseband correction unit 301 detailed in FIG. 3. The system may include, for example, a solid state device or an integrated circuit for performing the gain and phase imbalance methods as detailed in FIG. 4.

Figure 12:
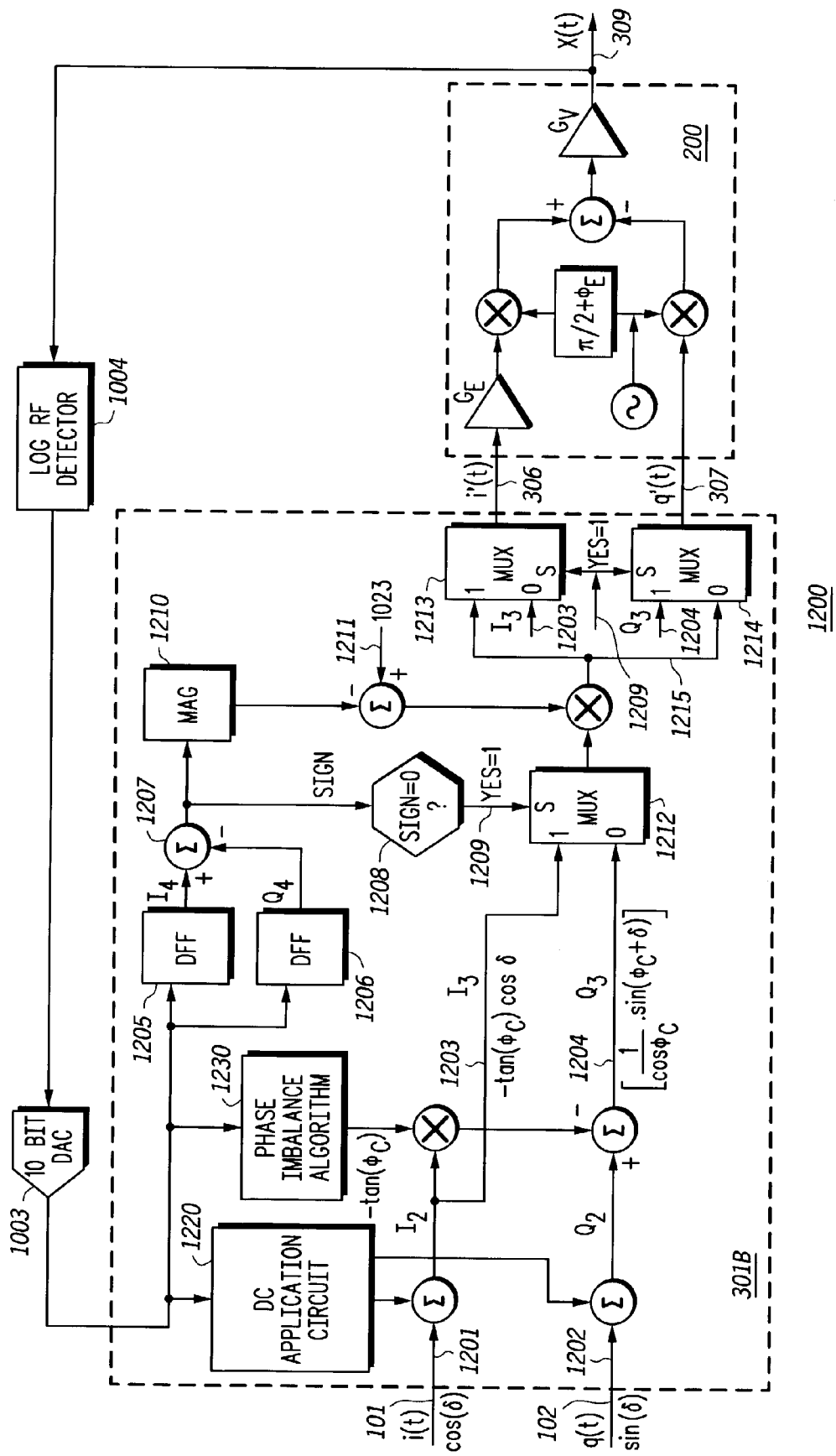
FIG. 12 is a block diagram of a gain and phase imbalance correction logic circuit, representing an embodiment of the invention.

Referring to FIG. 12, a block diagram of a gain and phase imbalance correction logic circuit 1200 is depicted according to one aspect of the invention. The baseband correction unit 301B is coupled to the real modulator 200. In this embodiment, a 2-dimensional carrier suppression method may be performed by a carrier suppression and gain imbalance circuit 1220 to determine the I/Q DC offsets required for minimization of carrier leakage term. This may be done prior to sideband suppression steps to minimize carrier leakage effect on the sideband suppression accuracy. Carrier suppression methods are well known in the art and need not be further detailed here. A gain imbalance correction method such as the one detailed in FIG. 5 may be controlled by the carrier suppression and gain imbalance circuit 1220 for determining a gain correction factor $G_C$.

Still referring to FIG. 12, the gain imbalance correction method may be implemented as follows. A DC voltage is applied by a DC application circuit 1220 to the in-phase channel i(t) 101. This value is applied in addition to a DC offset value determined during carrier suppression. A delay may be used to allow the output of the RF Log detector 1004 to settle. The analog-to-digital converter 1003 samples the detected voltage, and this value is registered using a D-flip flop 1205 ($I_4$ value). Next, the DC voltage is applied to the quadrature phase channel q(t) 102, with the in-phase channel I 101 value returned to its carrier suppression value. The delay may be repeated, followed by registering of the Q detected level by another D-flip flop 1206 ($Q_4$ value). The $Q_4$ detected level is subtracted from the $I_4$ detected level by element 1207 and the sign of the difference is determined by a sign determining circuit 1208. The sign of the difference ($I_4$-$Q_4$) determines which channel DC gain is greater between I and Q. A sign bit 1209 is used to select via a multiplexer 1212 which reference signal (1203 or 1204) is to be attenuated (the channel with higher gain is attenuated). The sign bit 1209 is also used to switch the attenuated signal 1215 to the appropriate output with multiplexers 1213 and 1214. An unattenuated signal (1203 or 1204) is also switched to the appropriate output by the sign bit 1209. The gain correction factor $G_C$ may be determined by an approximation. The output of summer 1207 is coupled to magnitude determining circuit 1210 and its output is subtracted from a full-scale multiplier value (for example, 1023 for a 10-bit multiplier) as an approximation to determine $G_C$ (i.e.: $G_C = I_4/Q_4 \approx I_4 - Q_4$). This approximation is accurate for a small gain imbalance $G_E$. Other $G_C$ calculation methods are possible and will be readily recognized by one of ordinary skill in the art in light of this disclosure.

Still referring to FIG. 12, phase imbalance correction methods such as the ones detailed in FIGS. 7 and 9 may be implemented as follows. The output of a phase imbalance circuit 1230 is a phase correction value of $-\tan(\Phi_C) = \Phi_C$ for small $\Phi_C$, where $\Phi_C$ is in radians. The carrier suppressed $I_2 = \cos(\sigma)$ signal 1201 is mixed with the $-\tan(\Phi_C)$ phase correction value and it is subtracted from the carrier suppressed $Q_2 = \sin(\sigma)$ signal 1202, where $\sigma$ is the phase of the complex modulation. The resulting $Q_3$ signal 1204 is:

$$\left[\frac{1}{\cos(\Phi_C)}\right]$$

$\sin(\sigma + \Phi_C)$. Thus, a small residual gain error of $$\left[\frac{1}{\cos(\Phi_C)}\right]$$

may be introduced. If the corrected phase imbalance circuit 1230 creates an unacceptable gain imbalance error, the gain correction procedure as detailed above can be repeated after phase correction. This may require that the DC offset values on the I and Q paths 101, 102 be applied prior to the phase imbalance correction circuit. Further, the $Q_3$ signal 1204 may be multiplied by a $\cos(\Phi_C)$ factor. In one embodiment, for a 6-bit $\Phi_C$ signal bit width, the phase shift on the $Q_3$ signal 1204 is between −13.5 to 14 degrees, with a 0.45 degree resolution.

Still referring to FIG. 12, in practice, the DC application circuit 1220 and the phase imbalance circuit 1230 can assume a variety of forms, including programmable circuits and hard-wired circuits. The DC application circuit 1220 and the phase imbalance circuit 1230 can also include a program storage media, which may be any type of readable memory.

In one embodiment suited for narrow bandwidth modulation applications where the gain and phase imbalances ($G_E$ and $\Phi_E$) are slow varying across the bandwidth, the invention may include the methods and/or apparatuses described above to minimize undesired sideband levels.

In another embodiment suited for wide bandwidth applications where the gain and phase imbalances ($G_E$ and $\Phi_E$) can vary significantly across the bandwidth such as, for example, wireless LAN applications (802.11a/HiperlanII), the methods and/or apparatuses described above may be repeated at various (LO) frequencies, and the resulting data may be applied to a complex equalizer or to individual frequency channels of an inverse fast Fourier transformer (IFFT) in order to minimize undesired sideband levels.

Further, the invention may be used in frequency hopping systems. As one of ordinary skill in the art will recognize in light of this disclosure, the gain and frequency correction factors ($G_C$ and $\Phi_C$) may be calculated on a frequency-band by frequency-band basis or, for example, as an average over several frequency bands.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The term substantially, as used herein, is defined as at least approaching a given state (e.g., preferably within 10% of, more preferably within 1% of, and most preferably within 0.1% of). The term program or software, as used herein, is defined as a sequence of instructions designed for execution on a computer system.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. A method for correcting a phase imbalance in a quadrature modulator, comprising:

applying a first phase and a first voltage level to a first quadrature modulator channel while applying the first voltage level to a second quadrature modulator channel and measuring a first output amplitude;

applying the first phase and the first voltage level to the first quadrature modulator channel while applying a second voltage level to the second quadrature modulator channel and measuring a second output amplitude;

applying a second phase and the first voltage level to the first quadrature modulator channel while applying the first voltage level to a second quadrature modulator channel and measuring a third output amplitude;

applying the second phase and the first voltage level to the first quadrature modulator channel while applying the second voltage level to the second quadrature modulator channel and measuring a fourth output amplitude;

determining a phase correction factor as a function of the first, second, third and fourth output amplitudes and the first phase; and correcting the phase imbalance using said gain correction factor.

2. The method of claim 1, wherein the first phase is the negative of the second phase.

3. The method of claim 1, wherein the first voltage level is the negative of the second voltage level.

4. The method of claim 1, wherein determining a phase correction factor $\Phi_C$ includes using the formula:

$$\Phi_C = -P\frac{(X_1 - X_2) \cdot (X_1 + X_2) + (X_3 - X_4) \cdot (X_3 + X_4)}{(X_1 - X_2) \cdot (X_1 + X_2) - (X_3 - X_4) \cdot (X_3 + X_4)};$$

wherein:
$\Phi_C$ is the phase correction factor;
P is the first phase;
$X_1$ is the first output amplitude;
$X_2$ is the second output amplitude;
$X_3$ is the third output amplitude; and
$X_4$ is the fourth output amplitude.

5. The method of claim 1, wherein determining a phase correction factor $\Phi_C$ includes using the formula:

$$\Phi_C = -P\frac{(X_1 - X_2) + (X_3 - X_4)}{(X_1 - X_2) - (X_3 - X_4)};$$

wherein:
$\Phi_C$ is the phase correction factor;
P is the first phase;
$X_1$ is the first output amplitude;
$X_2$ is the second output amplitude;
$X_3$ is the third output amplitude; and
$X_4$ is the fourth output amplitude.

6. A program storage device, readable by a machine and tangibly embodying a representation of a program of instructions adapted to be executed by said machine to perform the method of claim 1.

7. A method for correcting a gain imbalance and a phase imbalance in a quadrature modulator, comprising:
applying a first voltage level to a first quadrature modulator channel and measuring a first output amplitude;
applying a second voltage level to a second quadrature modulator channel and measuring a second output amplitude;
determining a gain correction factor as a function of the first output amplitude and the second output amplitude;
correcting the gain imbalance using said gain correction factor;
applying a first phase and a third voltage level to the first quadrature modulator channel while applying the third voltage level to the second quadrature modulator channel and measuring a third output amplitude;
applying the first phase and the third voltage level to the first quadrature modulator channel while applying a fourth voltage level to the second quadrature modulator channel and measuring a fourth output amplitude;
applying a second phase and the third voltage level to the first quadrature modulator channel while applying the third voltage level to the second quadrature modulator channel and measuring a fifth output amplitude;
applying the second phase and the third voltage level to the first quadrature modulator channel while applying the fourth voltage level to the second quadrature modulator channel and measuring a sixth output amplitude;
determining a phase correction factor as a function of the third, fourth, fifth and sixth output amplitudes and the first phase; and
correcting the phase imbalance using said phase correction factor.

8. A program storage device, readable by a machine and tangibly embodying a representation of a program of instructions adapted to be executed by said machine to perform the method of claim 7.

9. A baseband correction unit for correcting a gain and a phase imbalance in a quadrature modulator, comprising:
an error estimation circuit coupled to an output of the quadrature modulator via a detection circuit and to a pair of inputs to the quadrature modulator via a gain and phase compensating circuit, the error estimation circuit being operable to:
apply at least one predetermined voltage at a predetermined phase to the pair of inputs to the quadrature modulator and to detect at least one amplitude of an output voltage of said quadrature modulator;
calculate a gain and a phase imbalance as a function of said at least one detected amplitude, and to apply a gain and a phase correction to the pair of inputs to the quadrature modulator;
the error estimation circuit comprising:
a sideband suppression look-up table and control circuit coupled to the detection circuit, the sideband suppression look-up table being operable to map a detected magnitude to a phase offset; and
a complex phase rotator coupled to the sideband suppression look-up table and control circuit and to the pair of inputs to the quadrature modulator, the complex phase rotator being operable to apply the phase offset to the pair of inputs to the quadrature modulator.

10. The baseband correction unit of claim 9, the detection circuit comprising:
a radio frequency detector coupled to the output of said quadrature modulator; and
an analog-to-digital converter coupled to the radio frequency detector and to the error estimation circuit.

11. The baseband correction circuit of claim 9, the gain and phase compensating circuit comprising at least one multiplier and at least one summer.

12. The baseband correction circuit of claim 9, further comprising a program storage device coupled to the error estimation circuit.

13. The baseband correction circuit of claim 12, the program storage device including instructions for performing a phase correction factor calculation.

14. The baseband correction circuit of claim 9, further comprising a carrier suppression circuit coupled to an analog-to-digital converter and to the quadrature modulator.

15. The baseband correction circuit of claim 9, the error estimation circuit further comprising:
a DC application circuit coupled to the detection circuit and to a pair of quadrature modulator input channels;
a phase imbalance correction circuit coupled to the detection circuit and to the pair of quadrature modulator input channels;
a set of flip-flops coupled to the detection circuit;
a magnitude determining circuit coupled to the pair of flip-flops;
a set of multiplexers coupled to the magnitude determining circuit; and
a sign determining circuit coupled to the set of flip-flops and to set of multiplexers.

16. The baseband correction circuit of claim 15, the sign determining circuit being operable to select the outputs of the set of multiplexers according to a difference between outputs of the quadrature modulator.

17. A baseband correction unit for correcting a phase imbalance in a quadrature modulator, comprising:
an error estimation circuit coupled to the quadrature modulator for applying a voltage to the quadrature modulator, the error estimation circuit comprising:
a sideband suppression look-up table and control circuit, the sideband suppression look-up table being operable to map a detected magnitude to a phase offset; and
a complex phase rotator coupled to the sideband suppression look-up table and control circuit and to the quadrature modulator, the complex phase rotator being operable to apply the phase offset to the quadrature modulator.

* * * * *